(12) United States Patent
Anderson et al.

(10) Patent No.: US 6,909,431 B1
(45) Date of Patent: Jun. 21, 2005

(54) POSITION AND SHAPE CONTROL FOR CLOTH AND SOFT BODY ANIMATION

(75) Inventors: John R. Anderson, San Anselmo, CA (US); Jim Hourihan, San Francisco, CA (US)

(73) Assignee: Lucas Digital Ltd., San Rafael, CA (US)

( * ) Notice: Subject to any disclaimer, the term of this patent is extended or adjusted under 35 U.S.C. 154(b) by 0 days.

(21) Appl. No.: 09/516,925

(22) Filed: Mar. 1, 2000

Related U.S. Application Data

(60) Provisional application No. 60/122,200, filed on Mar. 1, 1999.

(51) Int. Cl.⁷ ............................................. G06T 13/00
(52) U.S. Cl. ....................................... 345/473; 345/423
(58) Field of Search ................................. 345/473, 423

(56) References Cited

U.S. PATENT DOCUMENTS 5,495,568 A * 2/1996 Beavin ......................... 700/83
6,573,890 B1 * 6/2003 Lengyel ....................... 345/419

* cited by examiner

Primary Examiner—Mark Zimmerman
Assistant Examiner—Adam Arnold
(74) Attorney, Agent, or Firm—Chan Law Group LC

(57) ABSTRACT

Animation controls according to the present invention introduce a predictable level of control for animation without the need for iterating the simulation. Controls include shape controls that permit the effect of the simulation to be overridden for cloth and soft body materials. The effect of shape tacks are to control the local shape of objects such as cloth and soft body materials, the shape may be weighted and time varying. Shape tacking is relative to the reference coordinate system of the object being shaped. Position tacks provide control in absolute space and permit accurate placement of an object to be animated overriding the control of the simulation.

2 Claims, 3 Drawing Sheets

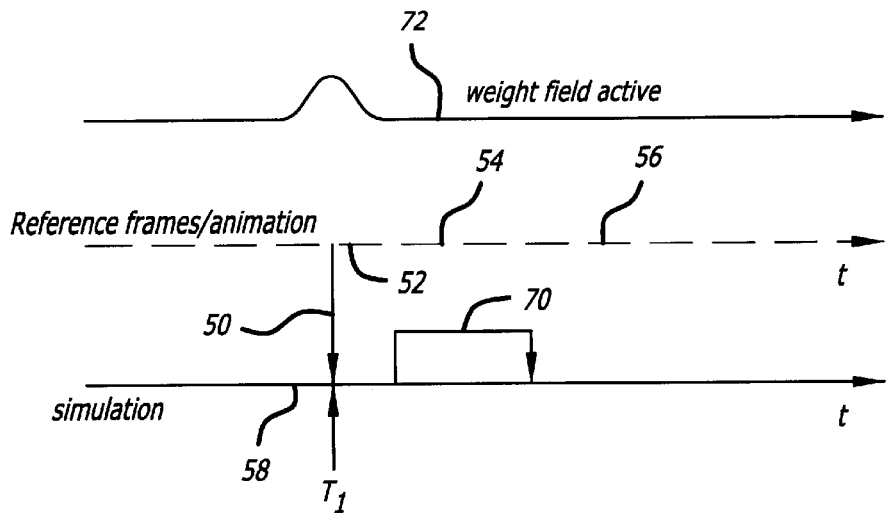
FIG. 5
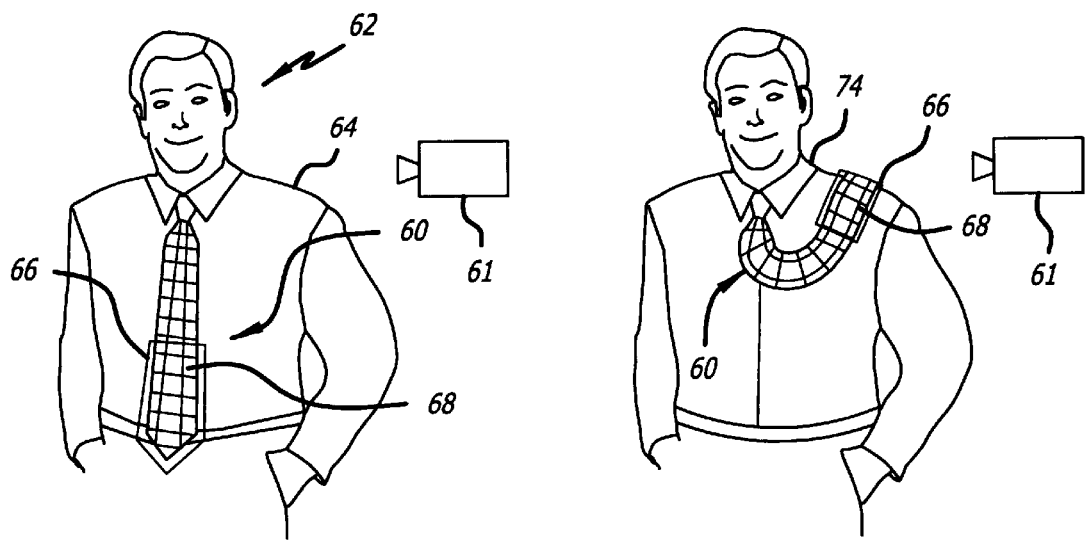
FIG. 6A  FIG. 6B

POSITION AND SHAPE CONTROL FOR CLOTH AND SOFT BODY ANIMATION

RELATED APPLICATION

This application claims priority of Provisional application Serial No. 60/122,200 filed Mar. 1, 1999.

BACKGROUND OF THE INVENTION

1. Field of the Invention

This invention relates to computer animation control techniques and more specifically to improved animation control techniques for the position and shape of cloth and other flexible surfaces.

2. Description of the Prior Art

Conventional animation has always been a labor intensive project. Having human effort create each and every image used to generate the animation allowed extensive control over how items to be animated appeared. The cost of the extensive control is paid in human labor. As more computers are used to generate animation, Human labor is minimized by using computer simulations to generate many of the frames embodying the animation.

Conventional computer simulation techniques for generation of animation are of two varieties, simple and complex. The complex techniques yield acceptable animation results but require large computational resources and may require several iterations to achieve the desired result. Simple techniques are computationally efficient and their results are crude and simple. Using simple simulation techniques may require many iterations to achieve a usable simulation from which a marginal animation may be generated.

SUMMARY OF THE INVENTION

A critical element for the implementation of cloth simulation techniques in visual effects is the ability to exercise a high level of control over the position and shape of the simulated objects. In a simulation system according to the present invention this control may be exercised by extracting shape and position information from a representation of the cloth object where a first approximation to the clothing position has been animated using an enveloping procedure where the cloth deformation is calculated using functions of the model joint angles. If necessary this initial approximation can be refined by hand sculpting procedures. This non-dynamic representation of the simulated mesh is then used to provide reference positions which are used during the simulations.

In a first aspect, a position tack method has been developed to control the motion and position of objects to be animated. Position tacks transfer position information from one or more reference frames to the animation simulation. Position tacks may be weighted and time varying and may be painted onto reference frames. Position tacks may also be derived from an earlier point in the simulation.

Another aspect of the present invention is for the transfer of shape information from the reference geometry to the simulation geometry in a time varying manner. This technique uses the shape of a region on the reference object rather than the position of individual points to influence the simulation. This technique is a shape tack, and first develops a local reference coordinate system for each point in the reference mesh. The coordinate system is defined by first constructing a cloud of points which are topologically close to the subject point in the mesh geometry. These points are then clustered into three groups of equal population by requiring that the total distance of the members from the center of mass of their respective cluster is minimized. When this clustering is finished the triangle defined by the centers of the three groups is used to define a local, surface based coordinate system for the subject point. The shape of the mesh at the point is then defined as the position of the point in this local coordinate system and shape tacks are implemented with a tracking filter identical to the position tack filter described above where the desired reference position is determined by transferring the shape parameter for the point from the reference animation to the simulation coordinate system.

Another form of simulation control uses the evolution of the simulation mesh itself to provide integration constraints. In a simulation system according to the present invention these controls are implemented in the form of freeze and repose tacks. Both freeze and repose tacks are implemented with continuous controls which are defined by an animated map which may be painted on the simulation mesh.

The freeze tack formulation is similar to the position tack but the desired position for the tracking filter is derived by maintaining a reference position which is accumulated by averaging over the period where the amplitude of the freeze tack is increasing. In this way it is possible to average the position of a simulation mesh over a period of time and then use this new value to constrain the following integration. A similar shape freeze tack is implemented in an identical way however the tack is defined in terms of the local shape of the mesh as described above. Freeze tacks are quite useful in the management of dynamic shifts of a garments configuration to prevent objectionable movement or pops.

A repose tack formulation uses a similar time blending method to develop a new geometry. In the repose tacks the new geometry is used to redefine the rest positions of the simulation mesh edge lengths and bending force springs so that a simulation mesh can be run for a pre-roll period and then the results of the pre-roll can be either blended with or used to replace the modeled rest lengths. This addition to the dynamics is very useful in creating stable and realistic simulation geometry such as the broken-in shape of a garment including age and wear wrinkles.

In another aspect, the present invention simulates the motion of a surface using the steps of selecting a surface, representing the surface using a plurality of elements, selecting two or more subsets of control elements for each element of the plurality of elements, interrelating the two or more subsets of control elements to control the local geometry of each element of the plurality of elements and animating the plurality of elements over time.

In a further aspect, the present invention simulates the motion of a surface using the steps of selecting a surface, representing the surface using a plurality of elements, applying a weight field to the plurality of elements and animating the plurality of elements over time.

In still another aspect, the present invention simulates the motion of a surface using the steps of selecting a surface to be controlled during a time period, selecting a reference position from a plurality of positions of the surface, averaging a subset of positions about the reference position over the time period and animating the surface.

In another still further aspect, the present invention simulates the motion of a surface using the steps of selecting a surface to be controlled during a time period, selecting a reference shape from a plurality of shapes of the surface, averaging a subset of shapes about the reference shape over the time period and animating the surface.

In another still further aspect, the present invention simulates the motion of a surface using the steps of selecting a surface having a first shape, representing the surface using a plurality of elements, each element having first characteristics, applying one or more forces to one or more elements, calculating second characteristics for each element and replacing the first characteristics with the second characteristics for each element.

In still another further aspect, the present invention simulates the motion of a surface using the steps of selecting a surface, representing the surface using a plurality of elements having an parent coordinate system, modifying the parent coordinate system and animating the plurality of elements over time.

These and other features and advantages of this invention will become further apparent from the detailed description and accompanying figures that follow. In the figures and description, numerals indicate the various features of the invention, like numerals referring to like features throughout both the drawings and the description.

BRIEF DESCRIPTION OF THE DRAWINGS

FIG. 5 is a time scale showing the relationship between weight field activity, animation reference frames and a dynamic simulation.

FIGS. 6A and 6B are drawings showing a character to be animated wearing clothing to be animated.

DETAILED DESCRIPTION OF THE PREFERRED EMBODIMENT(S)

Figure 1:
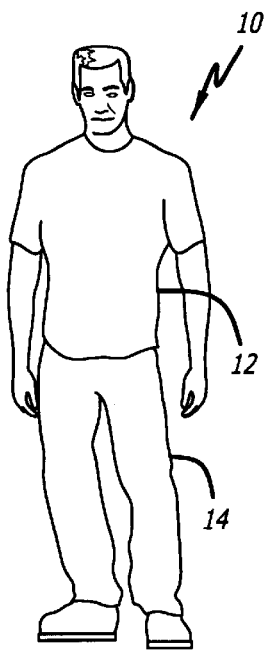
FIG. 1 is an illustration of a character wearing a garment to be animated according to the present invention.

Referring now to FIG. 1, it is desired to animate character 10, composed of object 14 wearing garment 12. Conventional techniques of generating a simulation of object 14 may be used, then garment 12 may be subjected to the simulation of object 14 using equations approximating the physics of some desired environment. The motion of garment 12 is then simulated using the motion of object 14 and the physics of the desired environment. In some situations, the physics of the desired environment, the physical characteristics of object 14, and the physical characteristics of garment 12 interact and do not result in the desired shape or motion or position of garment 12.

For example, if object 14 is thin and garment 12 is a thin bodied fabric, and if there is gravity in the desired environment, garment 12 will hang shapelessly on character 10 and will reveal the build of object 14. According to a first aspect of the present invention, an item to be simulated such as garment 12 or any part of garment 12 may be endowed with a particular shape or local geometry regardless of the physics of the simulation. The shape given garment 12 may be relative, thus, the shape of garment 12 may be maintained and garment 12 may move with object 14 as object 14 moves in the 3-dimensional simulation space as driven by the simulation.

Figure 2:
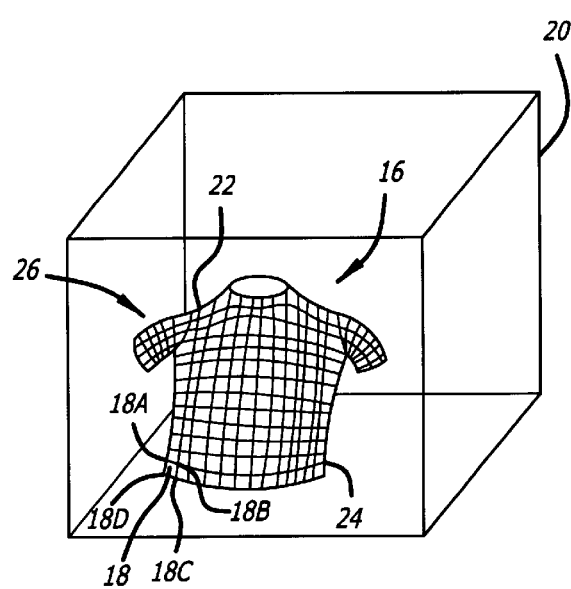
FIG. 2 is a 3-dimensional space containing a 3-dimensional animation mesh of the garment of FIG. 1.

Many conventional simulation techniques generally model items to be simulated as a collection of points interconnected by a mesh and compute position and motion of each mesh point of an item to be animated in 3-dimensional space. In a currently preferred embodiment of the present invention, a new technique of shape tacking or 3-dimensional averaging uses 3-dimensional mesh such as mesh 16 shown in 3-dimensional space 20 of FIG. 2. Mesh 16 may be generated from conventional reference geometry used to generate an animation simulation. Mesh 16 may be composed of one or more 3-dimensional shapes such as quadrilateral 18. Each 3-dimensional shape may be defined by 3 or more points, for example, quadrilateral 18 is defined by 4 points such as points 18A, 18B, 18C and 18D, the points formed by the intersection of lines such as line 22 and line 24. The simulation of motion of mesh 16 over time may be used to generate an animated rendered illustration of garment 12.

Shape Tack

Figure 3:
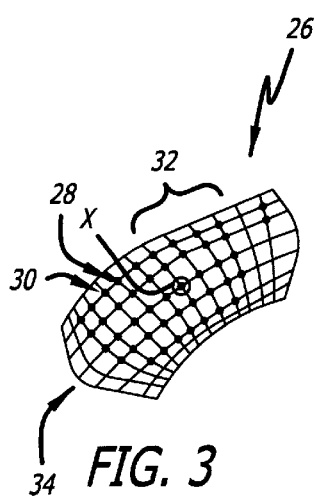
FIG. 3 is an illustration of an animation mesh of a sleeve of the garment of FIG. 1.

Referring now to FIG. 3, to maintain the 3-dimensional shape of an item or a portion of an item such as sleeve 26 during a time period T, a shape tack according to the present invention may be applied to every mesh point of the item or a portion of the item such as point X of sleeve 26. A region 34 of mesh points, such as mesh points 28 and 30, within range 32 of point X on the mesh of sleeve 26 are selected. Range 32 may be any size, the larger the range selected, the more rigid will be the shape of the item to be animated.

Figure 4:
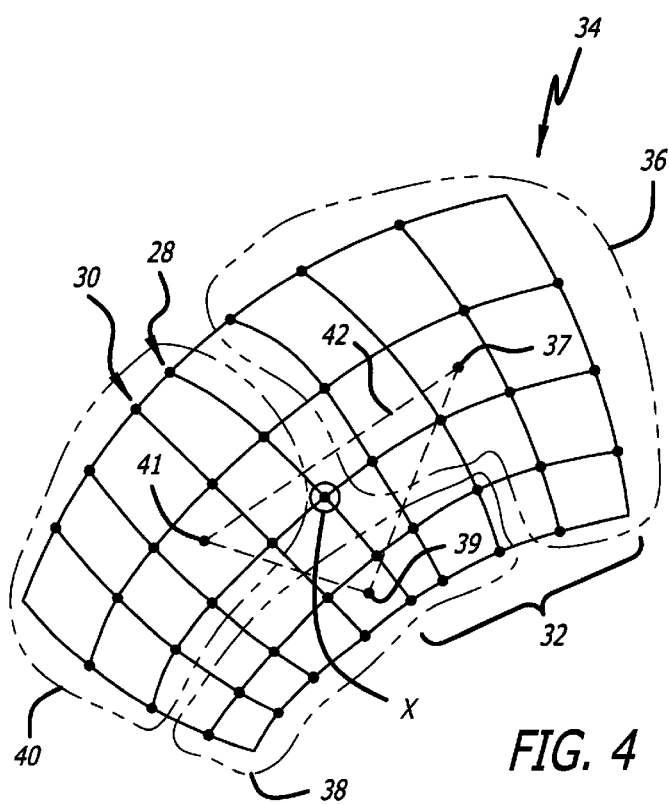
FIG. 4 is a close-up illustration of the sleeve of FIG. 3.

Referring now to FIG. 4, the mesh points of region 34 may be grouped into multiple clusters. A currently preferred embodiment of the present invention uses three clusters such as cluster 36, cluster 38 and cluster 40 having cluster centers 37, 39, and 41 respectively. In a currently preferred embodiment of the present invention the mesh points such as points 28 and 30 are clustered by selecting groups to minimize the sum of the distances between the mesh points of the group and the center of the cluster. Other suitable techniques of clustering the mesh points and selecting the cluster centers may be used. Cluster centers 37, 39 and 41 define a triangle 42 about point X. Triangle 42 may be used to define a local coordinate system for point X, thus the location of point X may be defined in terms of neighboring mesh points within range 32. Each mesh point of an area under the influence of a shape tack according to the present invention may have a local coordinate system calculated for it as discussed. The heightened interdependence of mesh points such as point X on the relative position of its neighbors such as mesh point 28 and mesh point 30 imposed by the present invention tends to render areas of mesh points such as region 34 relatively independent of the shape changing effects of the simulation. Shape tacking according to the present invention may also be used in a weighted and time varying manner and may add bending stiffness and damping to the simulation of an object to be animated.

Position Tack

Referring now to FIGS. 5, 6A and 6B, in another embodiment of the present invention position tacks such as tack 50 are used to control the motion and absolute position of an object to be animated such as tie 60. Character 62 may be animated by a simulation based on reference frames such as such as frames 52, 54 or 56. Objects dependent on the motion of character 62 such as shirt 64 and tie 60 may be exposed to forces generated by the reference motion, i.e. the motion of the object, character 62, on which dependent objects such as shirt 64 and tie 60 depend. As an example, it is desired to have tie 60 in position as shown in FIG. 6B at time $T_1$.

Position tacks such as tack 50 make use of a weight field 66 which represents the degree to which the reference motion will be followed by a particular part of the simulation object such as tie 60. Weight field 66 may be applied to objects to be animated such as tie 60 in any conventional manner such as painting. Weight fields such as weight field 66 are used to create a tracking time parameter P for each point such as point 68 in the simulation object with parts of the mesh containing higher weights being assigned a shorter time. The forces generated by the position tack are calculated by computing the accelerations required to arrive at the reference position in 3-dimensional space while matching the reference velocity under the assumption that the velocity of the reference object remains unchanged. This technique produces accelerations which include both an attractive component and a velocity damping component. The overall effect is a very natural appearance which allows a user to specify that the simulation mesh 16 follows the reference mesh with a degree of fidelity which can vary continuously from subtle influence to rigid emulation without any artifacts such as overshoot associated with conventional force based targeting. Curves such as curve 72 may be used to determine the periods during which weight field 66 may be active and effect the simulation.

Position tacks such as tack 50 may be weighted and time varying and may be applied to reference frames in any conventional manner such as painted on. Position tacks may also relate back to a position, or derive from an earlier point in the simulation such as tack 70. Tacks such as shape and position tacks may be used to add body and bending stiffness to an object to be animated in a blatant manner without iterating the simulation and possibly introducing unwanted effects.

Freezes

A freeze control may be used to avoid unwanted artifacts of the simulation causing unwanted or ill-timed motion of an object to be animated such as tie 60. A freeze control calculates a position or shape as in tacks, and instead of referencing to the envelope position, the position or shape is referenced to the history of the position or shape. Thus position or shape is averaged over a specified period of the simulation. In the averaging period, the shape or position is integrated to generate a target shape or target position.

In a freeze tack formulation the desired position for the tracking filter is derived by maintaining a reference position which is accumulated by averaging over the period where the amplitude of the freeze tack is increasing.

$$X_f^{t+1} = X_f^t \quad \quad | C_f^{t+1} \leq C_f^t$$
$$X_f^{t+1} = \frac{C_f^t}{C_f^{t+1}} X_f^t + \frac{C_f^{t+1} - C_f^t}{C_f^{t+1}} X^{t+1} \quad | C_f^{t+1} > C_f^t$$

$X_f^t$ is the current freeze position.
$X^t$ is the current point position.
$C_f$ is the freeze tack weight.

In this way it is possible to average the position of a simulation mesh over a period of time and then use this new value to constrain the following integration. A similar shape freeze tack is implemented in an identical way however the tack is defined in terms of the local shape of the mesh as described above.

Repose and Protect Tack

Figure 7:
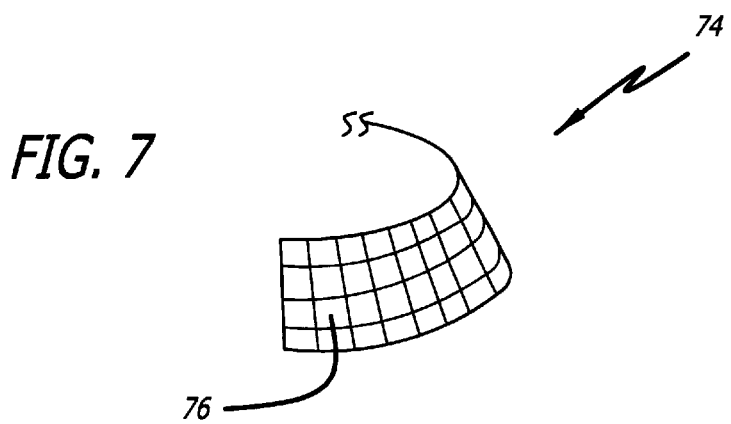
FIG. 7 is a close-up view of the collar from FIGS. 6A and 6B showing the simulation mesh.

Referring now to FIG. 7, repose is used instead of remodeling for correcting a reference frame rest pose. A repose function A rest pose is a neutral position selected for each object to be animated, such as collar 74, prior to beginning calculations of the simulation. In a currently preferred embodiment of the present invention, collar 74 is simulated as a mesh composed of many quadrilaterals such as quad 76.

Figure 8A:
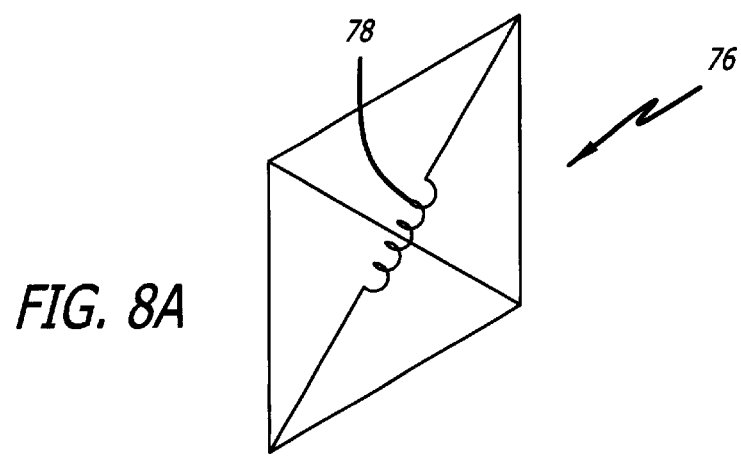
FIGS. 8A and 8B are drawings showing top and side views of a quad from the collar of FIG. 7.
Figure 8B:
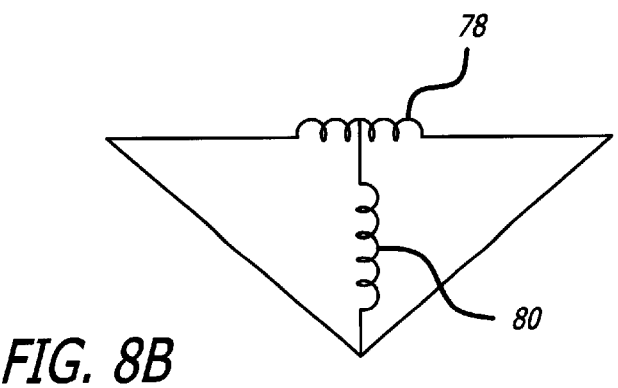

Referring now to FIGS. 8A and 8B, in a rest pose, the simulation force elements that comprise quad 76 such as restoring spring 78 and stiffness spring 80 are in an unstretched or rest position. Repose may be selected at any point during the simulation at which cloth garment 10 is in a desired position. The selection of repose initiates a recalculation of the rest lengths of restoring spring 78 and stiffness spring 80 used to simulate collar 74.

Dynamic Weight Fields

Toon controls such as a protection tack permit localized control of the physics of a simulation to create or display specific actions such as seen in hand animated cartoons. For example, a protection tack may be used to control how much acceleration is imparted to a dependent object from a parent coordinate system or reference frame. If character 62 of FIG. 6A were to accelerate to 400 miles per hour in the simulation and then to stop immediately, a protection tack applied to shirt 64 and tie 60 would prevent shirt 64 and tie 60 from continuing at 400 miles per hour and tearing off of character 62.

Toon controls provide an area of modified physics such as modified inertia and or gravity. The modified physics may be imparted from another reference object in the frame of animation, or from some other reference point such as camera 61.

Another Toon control is a soften field which may be applied to reduce tensile and or bending stiffness of an object to be animated such as cloth. Toon controls may be applied in any conventional manner such as painting.

Having now described the invention in accordance with the requirements of the patent statutes, those skilled in the art will understand how to make changes and modifications in the present invention to meet their specific requirements or conditions. Such changes and modifications may be made without departing from the scope and spirit of the invention as set forth in the following claims.

We claim:

1. A method of simulating motion of a surface comprising the steps of:

selecting a surface to be controlled during a time period;

selecting a reference position from a plurality of positions of the surface;

averaging a subset of positions about the reference position over the time period by integrating a subset of positions to generate a target position; and animating the surface.

2. A method of simulating motion of a surface comprising the steps of:

selecting a surface to be controlled during a time period;

selecting a reference position from a plurality of positions of the surface;

averaging a subset of positions about the reference position over the time period by integrating a subset of shapes to generate a target shape; and animating the surface.

* * * * *